United States Patent [19]

Logothetis

[11] 3,904,590
[45] Sept. 9, 1975

[54] PROCESS FOR POLYMERIZING CHLOROBUTADIENES

[75] Inventor: Anestis Leonidas Logothetis, Louisville, Ky.

[73] Assignee: E. I. du Pont de Nemours and Company, Wilmington, Del.

[22] Filed: May 20, 1974

[21] Appl. No.: 471,809

Related U.S. Application Data

[63] Continuation-in-part of Ser. No. 399,329, Sept. 20, 1973, abandoned.

[52] U.S. Cl........ 260/79.3 R; 260/79.3 A; 260/92.3
[51] Int. Cl.$^2$ .................. C08F 28/00; C08F 136/16; C08G 75/00
[58] Field of Search.......... 260/79.3 A, 79.3 R, 92.3

[56] References Cited
UNITED STATES PATENTS

| | | | |
|---|---|---|---|
| 2,371,719 | 3/1945 | Starkweather | 260/79.3 R |
| 2,679,497 | 5/1954 | Uraneck et al. | 260/92.3 |
| 3,123,590 | 3/1964 | Uraneck et al. | 260/92.3 |
| 3,535,249 | 10/1970 | Larson | 260/45.85 N |
| 3,642,728 | 2/1972 | Canter | 260/79.3 R |

*Primary Examiner*—Ronald W. Griffin

[57] ABSTRACT

When chlorobutadienes are copolymerized with sulfur dioxide by mixing in aqueous, acidic emulsion in the presence of an acid-stable surfactant, the polymerization often initiates spontaneously and proceeds in an uncontrolled manner. It has been found that the initiation and rate of polymerization can be controlled within acceptable limits when the total amount of acid-stable surfactants is between 0.3 and 4.0 parts per 100 parts of chlorobutadiene by (1) having an iron-chelating compound present in the chlorobutadiene component or in the aqueous component or in both prior to mixing them; and (2) adding incrementally or continuously quantities of an iron (II) salt as needed to initiate the polymerization and sustain it at a desired, controlled rate until the polymerization reaches a desired degree of completion.

11 Claims, No Drawings

PROCESS FOR POLYMERIZING CHLOROBUTADIENES

CROSS-REFERENCE TO RELATED APPLICATION

This is a continuation-in-part of my copending application Ser. No. 399,329, filed Sept. 20, 1973, now abandoned.

BACKGROUND OF THE INVENTION

Chlorobutadienes are commonly polymerized in aqueous, alkaline emulsions using surfactants such as rosin soaps as emulsion stabilizers. Starkweather U.S. Pat. No. 2,371,719 describes processes for polymerizing chloroprene (2-chloro-1,3-butadiene) in an aqueous emulsion rendered acidic by the presence of sulfur dioxide, using acid-stable surfactants as emulsion stabilizers, the product so obtained containing copolymerized chloroprene and sulfur dioxide.

Polymerization systems of the type described in the Starkweather patent have an advantage in that by selection of appropriate quantities of the system's components stable chloroprene polymer latexes can be prepared containing lower levels of surfactants than are necessary for stabilization of latexes made without sulfur dioxide. Unfortunately, the polymerization reaction often initiates spontaneously and proceeds in an uncontrolled manner at an undesirably high rate. After the spontaneous reaction is brought under control, or in those cases where it is not encountered, the polymerization responds sluggishly or not at all to conventional catalysts used in chlorobutadiene polymerizations. For commercialization of such chloroprene-sulfur dioxide copolymerizations, control of the initiation and rate of polymerization are essential to achieve process safety and product quality control.

SUMMARY OF THE INVENTION

Now according to the present invention it has been found that in processes wherein a chlorobutadiene of the group consisting of chloroprene; 2,3-dichloro-1,3-butadiene; and mixtures of these, is copolymerized by mixing with sulfur dioxide in aqueous, acidic emulsion in the presence of 0.3–4.0 parts total of an acid-stable surfactant or a mixture of acid-stable surfactants, the initiation and rate of polymerization can be controlled by (1) having an iron-chelating compound present in the chlorobutadiene component or in the aqueous component or in both prior to mixing them; and (2) adding incrementally or continuously quantities of an iron (II) salt as needed to initiate the polymerization and sustain it at a desired, controlled rate until the polymerization reaches a predetermined degree of completion.

DESCRIPTION OF THE PREFERRED EMBODIMENTS

1. The Chloro-1,3-Butadiene

While the invention relates primarily to the polymerization of chlorobutadienes and is so described herein, those skilled in the art will recognize that a part of the chlorobutadiene monomer can be made up of another, ethylenically-unsaturated copolymerizable monomer without departing from the spirit of the invention. Thus, a chlorobutadiene containing up to 50% by weight of another, copolymerizable monomer, such as methylmethacrylate for example, is considered to be within the scope of the claims.

2. The Monomer Emulsion

The chlorobutadiene is emulsified in water in accordance with known techniques to give the medium in which the polymerization of the invention is carried out. The emulsion advantageously can contain modifiers well known to those skilled in the art. Examples of suitable modifiers are alkyl mercaptans such as dodecyl mercaptan; dialkyl xanthogen disulfides such as diethyl xanthogen disulfide; iodoform; and sulfur.

A solution, in the chlorobutadiene, of the modifier and any oil-soluble emulsifier selected for the emulsion can be mixed under conditions of high shear with a water solution containing the essential water-soluble constituents - namely, the acid-stable surfactant, the sulfur dioxide, and the iron-chelating compound. Suitable mixing equipment comprises an Eppenbach homomixer or centrifugal pumps through which the mixture is passed.

3. The Acid-Stable Surfactant

Acid-stable surfactants are essential to provide stability to the monomer emulsion prior to and during polymerization. Suitable surfactants include: sodium salts of $C_{12}$—$C_{18}$ alkyl sulfates; sodium salts of formaldehyde naphthalene sulfonic condensation products; and quaternary ammonium salts such as cetyl trimethylammonium chloride and octadecyl trimethylammonium bromide. A surfactant may be used alone or in combination with one or more other surfactants of similar nature. The presence of at least 0.3 parts total surfactant per 100 parts of chlorobutadiene monomer is needed to stabilize the monomer emulsion. Up to 4 parts of surfactant may be used, but 0.5 to 1.5 parts is the preferred range as it provides a stable emulsion and keeps surfactant contamination of the product at a low level. More than 4 parts of surfactant is to be avoided as control of spontaneous polymerization by this invention becomes unreliable.

The compatibility and suitability of an acid-stable surfactant in the monomer emulsion may be determined by the following empirical test:

A mixture of 100 parts of chloroprene, 100 parts of water, and 2–4 parts of surfactant, all parts by weight, is emulsified with an Eppenbach homomixer operated at full speed for approximately 2 minutes. To the resulting emulsion a solution of 5% aqueous hydrochloric acid is added with stirring until the pH of the emulsion is about 1.0. If the emulsion does not break after standing without being stirred for 30 minutes following the pH adjustment, the surfactant is suitable for use in this invention.

4. The Sulfur Dioxide

At least 0.01 part of sulfur dioxide per 100 parts of chlorobutadiene monomer is present during the polymerization. Greater quantities of sulfur dioxide can be used, up to its limit of solubility in the chlorobutadiene emulsion. Preferably the amount of $SO_2$ present falls in the range of 0.05 to 0.20 parts per hundred of chlorobutadiene. This concentration is sufficient to provide a stable polymer latex at the conclusion of polymerization, and the polymer has better vulcanizate physical properties than those made in the presence of greater concentrations of sulfur dioxide.

Compounds which are capable of generating sulfur dioxide in situ can be used in place of free sulfur dioxide. An example of such a compound is sodium bisulfite which in the acidic polymerization medium can release sulfur dioxide in solution.

5. The Iron-Chelating Agent

Iron-chelating agents are well known to those skilled in the art, being described, for instance, in Kirk-Othmer *Encyclopedia of Chemical Technology*, Vol. 6, pp. 1–24, Second Edition, John Wiley & Sons, Inc. (1965). Among compounds of this type the tetrasodium salt of ethylene-diamine tetraacetic acid and citric acid are preferred. Other chelating agents include, for example, N-hydroxyethylene-diaminetriacetic acid, tartaric acid, and potassium oxalate.

The iron-chelating compound can be incorporated in the chlorobutadiene emulsion by adding it in either the chlorobutadiene component or the aqueous component or both. Alternatively the sulfur dioxide and a portion of the aqueous component can be withheld at the time of mixing the components to form the emulsion and the iron-chelating compound can be added to the emulsion with a solution of the sulfur dioxide in the withheld water. In any case it is essential that the iron-chelating compound be added to the emulsion prior to or at the same time as the sulfur dioxide in order to avoid uncontrollable spontaneous polymerization.

The range of concentration of the iron chelating agent is, broadly, 0.001 to 1.0 and preferably 0.02 to 0.10 parts by weight per 100 parts by weight of monomer in the monomer emulsion.

6. The Polymerization Process

In a process of this invention, after the presence of the iron-chelating compound has been effected as above described, polymerization is conducted in a suitable reaction vessel equipped with means to agitate the emulsion, supply a nitrogen atmosphere over the surface of the emulsion, and measure emulsion temperature and specific gravity. A reaction temperature of −10° to +60°C can be used, but a temperature in the range of 10 to 40°C is preferred. At temperatures below +5°C an antifreeze such as methanol is used to prevent freezing of the emulsion.

Although the practice of this invention avoids the spontaneously initiated polymerizations proceeding at undesirably high rates which are encountered with the prior art systems, spontaneous polymerization which does not exceed the desired polymerization rate may occur on occasion. The frequency of this occurrence increases as either the polymerization temperature or the total concentration of surfactants is increased. For the purpose of this specification and claims, an undesirably high rate of spontaneously initiated polymerization is a rate that exceeds 1% conversion of the starting chloroprene monomer per minute. The rate of conversion is determined by measuring the specific gravity of the emulsion, as is well known in the art. If it is desired to inhibit the spontaneous polymerization completely, polymerization temperature and surfactant concentration should be kept as low as possible. In addition, small amounts of conventional polymerization inhibitors, such as 4-tertbutylcatechol or phenothiazine, can be added to the monomers prior to emulsification.

When the initial spontaneous polymerization begins to subside, the desired polymerization rate can be sustained by adding continuously or incrementally, in quantities as needed, an iron (II) salt, that is, an iron salt in which the valence of the iron is 2. The salt is preferably added as an aqueous solution and hence should be water soluble. Ferrous acetate, potassium ferrocyanide, ferrous chloride, ferrous sulfate, and potassium ferrothiocyanate are typical of iron (II) salts that can be used. Ferrous ammonium sulfate is especially preferred, the concentration being preferably 0.2 to 0.6% by weight.

When spontaneous polymerization is not encountered the polymerization is initiated by adding to the polymerization reaction vessel, which has been charged with reactants as above described, an appropriate amount of the above described iron (II) salt. The amount of iron (II) salt to use can be readily ascertained by cautiously adding an initial amount and watching for signs of polymerization reaction such as a tendency toward temperature rise. Once the polymerization has been initiated in this manner the reaction is continued by adding further quantities of iron (II) salt, continuously or incrementally, as needed to control the polymerization at the desired rate, which should not exceed about 1% of monomer conversion per minute.

Progress of the polymerization can be followed by periodically measuring the specific gravity of the polymer dispersion. When a gravity corresponding to the desired conversion of monomer to polymer is reached the reaction is terminated by the addition of a short-stopping agent, e.g., an aqueous dispersion of a solution of p-tert-butyl catechol and phenothiazine in toluene. Usually, polymerization will be carried out to a conversion of about 60–100% of the starting monomer, depending on the intended application of the product. Higher conversions usually are desired for latex products and lower for solid polymers to be isolated from the latex. The preferred degree of conversion is about 70–80%.

At the termination of the polymerization, rosin acids in the form of their alkali metal salts can be added to the emulsion after its pH has been adjusted to about 10 with 2–5% NaOH or KOH. Although this addition is optional, it is preferred to add 0.5 to 1.5 part of the salts per 100 parts of chlorobutadiene monomer in order to give the latex greater mechanical stability. This addition prevents coagulum from forming during stripping of excess monomer from the latex with steam and provides for maximum storage stability of the dry polymer.

As an option to adding the rosin acid as its salt at the termination of polymerization, the free rosin acid may be added during emulsion make-up and be present during polymerization as an inert ingredient. At termination of polymerization the emulsion is adjusted to pH 10 by the addition of 2% aqueous KOH or NaOH to achieve stabilization of the emulsion for monomer stripping.

EXAMPLES

The invention will be better understood by reference to the following illustrative examples. In these examples, as well as in the foregoing disclosure, parts refers to parts by weight unless otherwise indicated.

Monomer solutions and water solutions of the compositions shown in Table I hereinbelow were prepared separately. Monomer solutions were prepared in an atmosphere of nitrogen. All amounts in Table I are in parts by weight of active ingredient. Total amounts in each example are 18 times the basic recipes shown in Table I. The monomer and water solutions for each emulsion are combined and mixed under conditions of high shear using an Eppenbach homomixer and 3.0 minutes mixing time. A nitrogen blanket is maintained over the surface of the emulsion at all times.

The emulsion is transferred to a 5-liter four-neck flask equipped with a stirrer, thermometer, burette for continuously adding catalyst solution, and a device for periodically withdrawing an emulsion sample for measurement of the specific gravity. Temperature of the emulsion is adjusted to the desired reaction temperature by heating or cooling the exterior of the flask, and is maintained in this manner during the course of the polymerization.

Polymerization is initiated by addition of iron II salt catalyst solution, and is maintained at a desired rate by incremental addition of catalyst. At the desired conversion polymerization in each example is terminated by the addition per 100 parts of chloroprene monomer of 0.016 part of p-tert-butylcatechol and .016 part of phenothiazine dissolved in 1.0 parts of toluene in the form of an aqueous dispersion.

Following termination of polymerization, 2% aqueous NaOH or KOH is added to the latex to adjust the pH to about 9–10. In some examples, as indicated in Table I, additional surfactant is added as well.

Unreacted monomer is removed by stripping with steam according to the procedure described in U.S. Pat. No. 2,467,769. Latex is then adjusted to pH 5.6 by addition of dilute acetic acid, and the polymer is isolated by freeze coagulation according to the procedure described in Example 4 of U.S. Pat. No. 2,187,146, and dried in an air circulating oven.

Examples 1-8, shown in Table I, illustrate the scope of the instant invention in preparation of useful chloroprene polymers. Terms used in Table I are explained in Table II. Amounts are shown in parts by weight.

Surfactant C present in Example 7 is an oil soluble nonionic surfactant which imparts storage stability to the isolated polymer.

TABLE I

| Example | 1 | 2 | 3 | 4 | 5 | 6 | 7 | 8 |
| --- | --- | --- | --- | --- | --- | --- | --- | --- |
| Monomer Solution | | | | | | | | |
| chloroprene | 100 | 100 | 100 | 100 | 100 | 100 | 100 | 100 |
| ethylene dimethacrylate | — | — | — | — | 1.5 | — | — | — |
| methacrylic acid | — | — | — | — | — | 2.0 | — | — |
| dodecyl mercaptan | .3 | .3 | .28 | — | .3 | — | .2 | .2 |
| PXD | — | — | — | .75 | — | 1.1 | — | — |
| Disproportionated wood rosin | .5 | .5 | — | .5 | — | — | — | — |
| Surfactant A | .16 | .16 | — | .16 | — | .25 | — | — |
| Surfactant B | — | — | .11 | — | — | — | — | — |
| Surfactant C | — | — | — | — | — | — | 1.00 | — |
| para-tert-butyl catechol | — | — | — | — | — | — | — | .002 |
| Water Solution | | | | | | | | |
| water | 98 | 98 | 98 | 98 | 107 | 109 | 114 | 112 |
| Surfactant A | — | — | — | — | .25 | — | — | — |
| Surfactant D | .65 | — | .65 | .65 | — | .63 | — | — |
| Surfactant E | — | .65 | — | — | .65 | — | 1.4 | 1.4 |
| Surfactant F | — | — | — | — | — | — | 1.0 | 1.0 |
| sulfur dioxide* | .17 | .17 | .17 | .17 | .14 | .13 | .13 | — |
| complexing agent (a) | .06 | .06 | .06 | .06 | .04 | .02 | .04 | — |
| complexing agent (b) | — | — | — | — | — | — | — | .10 |
| NaHSO₃ | — | — | — | — | — | — | — | .05 |
| Catalyst Solution | | | | | | | | |
| Fe(NH₄)₂.SO₄.6H₂O | .007 | .007 | .009 | .007 | .007 | .005 | .01 | .0025 |
| water | 2.8 | 2.8 | 1.8 | 2.8 | 2.8 | 1.5 | 2.0 | .50 |
| Polymerization temperature, °C. | 40 | 40 | 40 | 40 | 42 | 42 | 15 | 40 |
| Chloroprene Conversion | 65 | 65 | 65 | 65 | 100 | 65 | 84 | 86 |
| Post-polymerization Addition | | | | | | | | |
| Surfactant G | — | — | 0.5 | — | — | 15 | 2.0 | 5.9 |
| Isolated polymer | | | | | | | | |
| Mooney Viscosity | 54. | 47. | 66. | 61. | gel | 44 | 72 | — |

*added as a 5% solution in water.

TABLE II

GLOSSARY OF TERMS USED IN TABLE I

| | |
| --- | --- |
| PXD — | diisopropyl xanthogen disulfide |
| Surfactant A — | sodium petroleum sulfonate, "Petronate" HL, Witco Chemical Corp. |
| Surfactant B — | phosphated surfactant, "Rozak" BD-100, Rozilda Chemicals, Inc. |
| Surfactant C — | Nonylphenol - ethylene oxide condensation product, "Triton" X-15, Rhom & Haas Co. |
| Surfactant D — | potassium salts of condensation products of formaldehyde and naphthalene sulfonic acid, "Daxed"-11KLS, W. R. Grace Co. |
| Surfactant E — | sodium salt of condensed naphthalene sulfonic acid, "Lomar" PW, Nopco Chemical Division. |
| Surfactant F — | triethanolammonium dodecylbenzene sulfonate, "Ultrawet" 60L, Arco Chemical Co. |
| Surfactant G — | sodium salt of wood rosin, "Dresinate" X, Hercules, Inc. |
| Complexing agent (a) — | tetrasodium ethylenediamine tetra-acetate, "Versene" 100, Dow Chemical Co. |
| Complexing agent (b) — | citric acid |

I claim:

1. In a process wherein a chlorobutadiene monomer of the group consisting of (a) chloroprene, (b) 2,3-dichloro-1,3-butadiene, (c) mixtures of chloroprene with up to 50 weight percent of a copolymerizable monomer, (d) mixtures of 2,3-dichloro-1,3-butadiene with up to 50 weight percent of a copolymerizable monomer, and (e) mixtures of any of the above monomers (a), (b), (c) and (d), is copolymerized by mixing with at least 0.01 part of sulfur dioxide, up to its solubility limit, in aqueous, acidic emulsion in the presence of 0.3–4 parts of an acid-stable surfactant, the improvement which comprises controlling the initiation and rate of polymerization by (1) having present in the emulsion at the time of mixing with sulfur dioxide 0.001–1.0 part of an iron-chelating compound, and (2) adding incrementally or continuously quantities of a water-soluble iron (II) salt as needed to initiate the polymerization and sustain it at a desired, controlled rate up to about 1% monomer conversion per minute until the polymerization reaches a predetermined degree of completion; all parts being by weight per 100 parts by weight of chlorobutadiene monomer.

2. A process according to claim 1 wherein the chlorobutadiene is chloroprene.

3. A process according to claim 1 wherein the iron-chelating compound is present in the chlorobutadiene component.

4. A process according to claim 1 wherein the iron-chelating compound is selected from the group consisting of tetrasodium salt of ethylenediamine-tetraacetic acid and citric acid.

5. A process according to claim 1 wherein the iron (II) salt is selected from the group consisting of ferrous acetate, potassium ferocyanide, ferrous chloride, ferrous sulfate, potassium ferrothiocyanate, and ferrous ammonium sulfate.

6. A process of claim 1 wherein the proportion of sulfur dioxide is 0.01–0.20 weight percent of the chlorobutadiene monomer.

7. A process of claim 1 wherein the degree of monomer conversion is about 60–100%.

8. A process of claim 7 wherein the surfactant concentration is 0.5–1.5 weight percent; the proportion of sulfur dioxide is 0.05–0.20 weight percent; and the concentration of the iron-chelating agent is 0.02–0.10 weight percent of the chlorobutadiene monomer.

9. The process of claim 1 wherein the concentration of the iron-chelating agent is 0.02–0.10 parts by weight per 100 parts by weight of monomer in the monomer emulsion.

10. The process of claim 1 wherein the proportion of sulfur dioxide is 0.05–0.20 part by weight per 100 parts by weight of monomer in the monomer emulsion.

11. The process of claim 1 wherein the polymerization temperature is within the range of 10°–40°C.

* * * * *